United States Patent [19]

Friedman et al.

[11] 4,349,257
[45] Sep. 14, 1982

[54] CAMERA HAVING A SELECTED PATTERN OF PRE-EXPOSURE FOR FINAL EXPOSURE CORRECTION

[75] Inventors: Melvin Friedman, Sudbury; William A. Holmes, Marblehead, both of Mass.

[73] Assignee: Polaroid Corporation, Cambridge, Mass.

[21] Appl. No.: 231,124

[22] Filed: Feb. 3, 1981

[51] Int. Cl.³ .................. G03B 15/03; G03B 17/00
[52] U.S. Cl. ............................... 354/126; 354/202; 352/46
[58] Field of Search .................... 354/27, 32–35, 354/60 F, 75–78, 126, 202, 202 FF, 354, 42, 49, 59; 352/45, 46, 49, 244; 355/67, 70, 71; 350/314; 362/16–18

[56] References Cited

U.S. PATENT DOCUMENTS 3,312,143  4/1967  Karow et al. .................. 355/71 X
3,854,815  12/1974  McIntosh ........................ 355/67
4,172,640  10/1979  Land ............................. 355/67 X

FOREIGN PATENT DOCUMENTS 7514354  8/1977  Netherlands .................... 355/67

OTHER PUBLICATIONS

IBM Technical Disclosure Bulletin, "Illumination Compensation for COS⁴-Lens Attenuation," by G. W. Hobgood, Jr., vol. 14, No. 11, Apr. 1972, p. 3324.

Primary Examiner—Donald A. Griffin
Assistant Examiner—William B. Perkey
Attorney, Agent, or Firm—Leslie J. Payne

[57] ABSTRACT

An in-camera supplemental exposure correction system for achieving an evenly exposed final photographic image in a situation wherein the photographic scene is non-uniformly illuminated by an artificial light source by pre-exposing the film to supplemental illumination having a non-uniform pattern which is the inverse of the artificial scene illumination.

11 Claims, 9 Drawing Figures

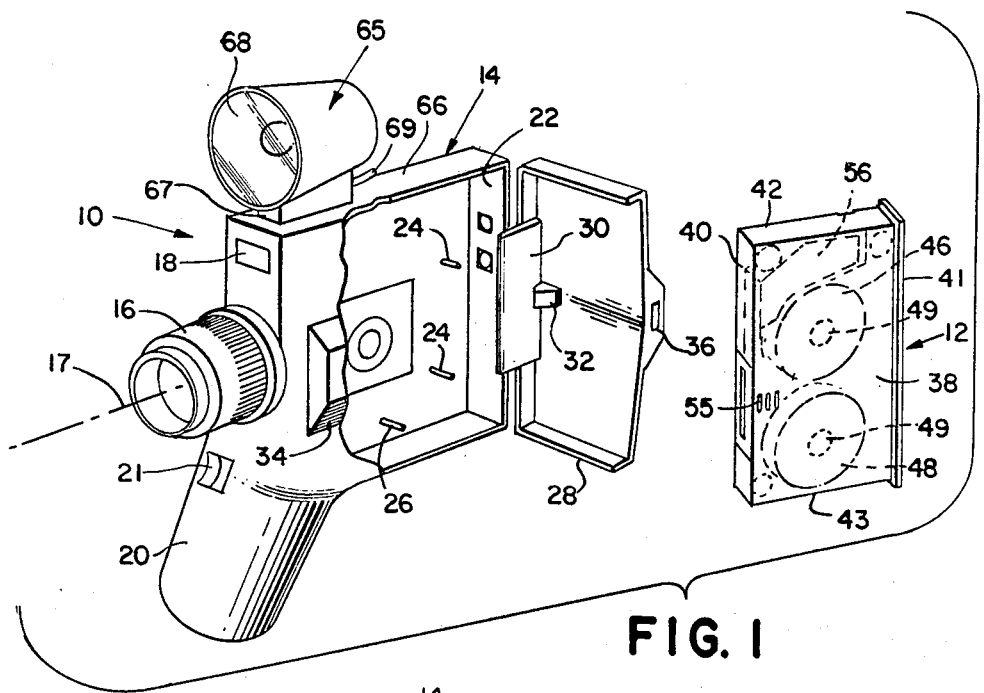
FIG. 1
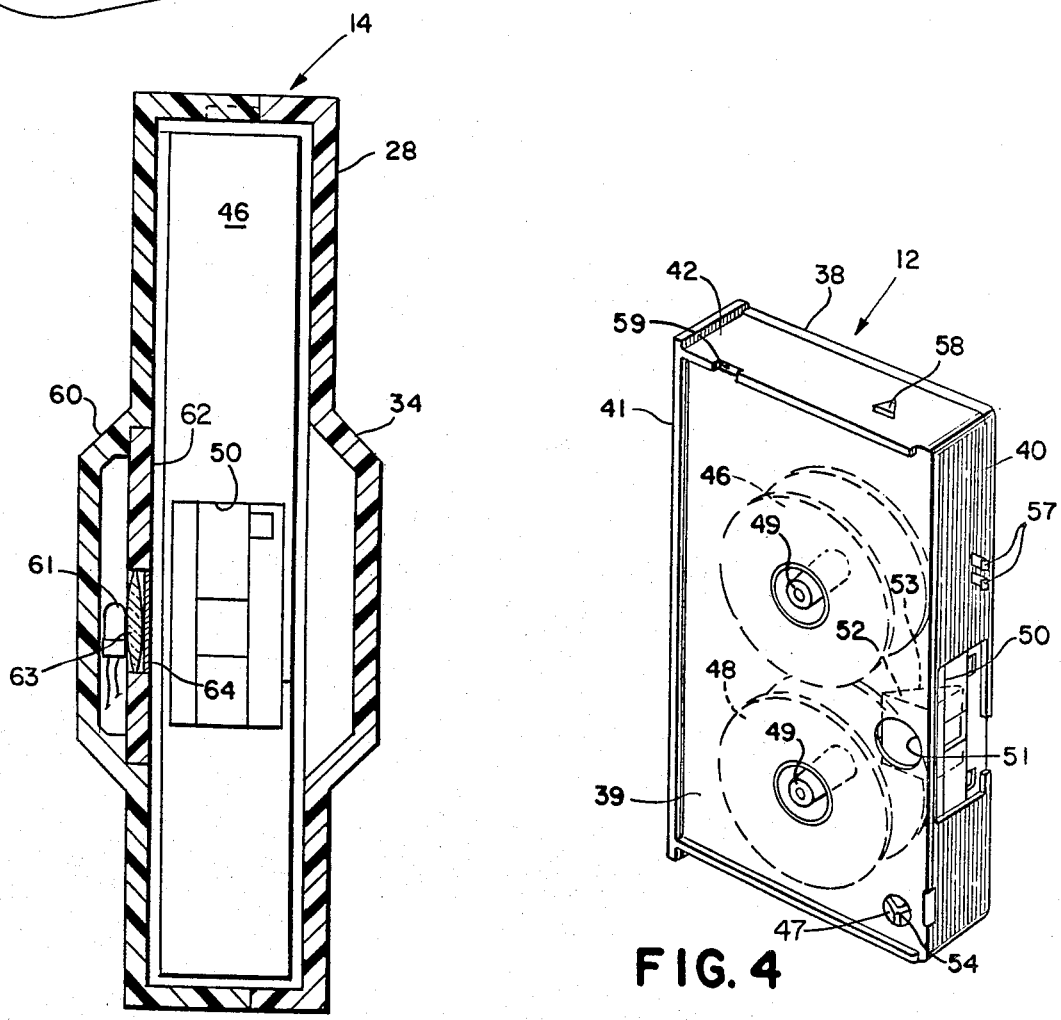
FIG. 3
FIG. 4

CAMERA HAVING A SELECTED PATTERN OF PRE-EXPOSURE FOR FINAL EXPOSURE CORRECTION

BACKGROUND OF THE INVENTION

This invention relates to a supplemental exposure system for a photographic camera. More particularly, it concerns a method and apparatus for achieving an evenly exposed final photograph in a situation wherein the photographic scene is non-uniformly illuminated by an artificial light source by pre-exposing the film to supplemental illumination having a non-uniform pattern which is the inverse of the artificial scene illumination.

A common problem encountered particularly by users of amateur photographic equipment using commercially available artificial lighting assemblies to illuminate the scenes to be photographed has been a non-uniform exposure of the resulting photographs. Such non-uniformity is predictable in that the intensity of the scene illumination with most commercially available artificial lighting assemblies is highest at the center of the scene and generally decreases with increasing distance away from the center. As a result, subjects in the scene which are located near its edges receive less light than subjects located near the center of the scene and, therefore, are darker than they should be in the resultant photograph.

Such a problem is encountered in still cameras utilizing flash cubes and linear flash arrays which typically combine photoflash lamps with reflectors to illuminate the scenes to be photographed as well as in motion picture cameras making use of movie light assemblies for illuminating the scene being photographed.

Those skilled in the photographic arts who have found such uneven scene illumination characteristics objectionable have provided photographic apparatus for use with such artificial lighting assemblies to improve their illumination distribution to a level of uniformity which they have considered acceptable for their particular purposes.

One such example is disclosed in U.S. Pat. No. DES. 218,863 issued to James M. Conner on Aug. 11, 1970, and entitled "Light Deflector for a Photographic Camera". The light deflector in this patent comprises a transparent plate having a plurality of elongated V-shaped grooves which are separated from one another at equal intervals along the side of the transparent plate which faces a flashcube and which operate to modify the light distribution of the flashcube to make it more uniform. While this deflector improves the uniformity of the illumination provided by the flashcube with which it is used, its particular arrangement operates to refract light from the flashcube in such a manner that the overall efficiency of the flashcube in combination with the deflector is reduced, thus reducing the maximum distance at which flash pictures may be taken using this combination.

Another example of an optical device for use with a flashcube is disclosed in U.S. Pat. No. 3,720,145 issued to Bruce K. Johnson, et al., on Mar. 13, 1973, and entitled "Portrait Camera Having Synchronized Flash Illumination Source". In this patent, a portrait camera is disclosed which has a Fresnel lens mounted in front of the flashcube to focus light from the flashcube to a relatively narrow and limited field angle substantially the same as that of the field of view of the camera. The Fresnel lens operates to generally reduce the angular extent of the flashcube's normal field coverage so that its light output is concentrated within the camera's field of view.

U.S. Pat. No. 4,204,269 to William T. Plummer entitled "Optical Element for Redistributing the Light Output of a Photoflash Lamp Assembly or the Like" offers still another light deflector configuration for attempting to solve the uneven illumination problem set forth hereinabove.

SUMMARY OF THE INVENTION

According to the present invention, a camera apparatus is provided which includes means for locating photographic film at a given focal plane and means for transmitting image forming light rays from the photographic scene to the focal plane for exposing the film located thereat. The image transmitting means defines a camera acceptance angle and an optical axis extending therealong. Means are provided for artificially illuminating the photographic scene. The illumination means produces a predetermined non-uniform illumination pattern over the scene area defined by the acceptance angle such that there is a difference in illumination between at least a first and a second portion within the illuminated scene area. A supplemental illumination arrangement is provided in the camera for directing supplemental illumination to at least one section of the focal plane corresponding to one of the scene portions having a lower predetermined illumination to reduce the difference in level of exposure of the first and second portions anticipated as a result of the non-uniform illumination of the artificial illumination assembly. In the preferred embodiment, the supplemental illumination directed to the focal plane is substantially the inverse of the predetermined illumination pattern.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic perspective view of a multipurpose cassette and a motion picture camera, partially cut away, incorporating a non-uniform supplemental exposure system of the present invention;

FIG. 3 is a cross-sectional view of the camera as seen along the line 3—3 of FIG. 2;

FIG. 4 is a perspective view showing the opposite side of the film cassette used with the supplemental exposure system incorporated into the camera of FIG. 1;

DETAILED DESCRIPTION OF THE PREFERRED EMBODIMENT

Figure 2:
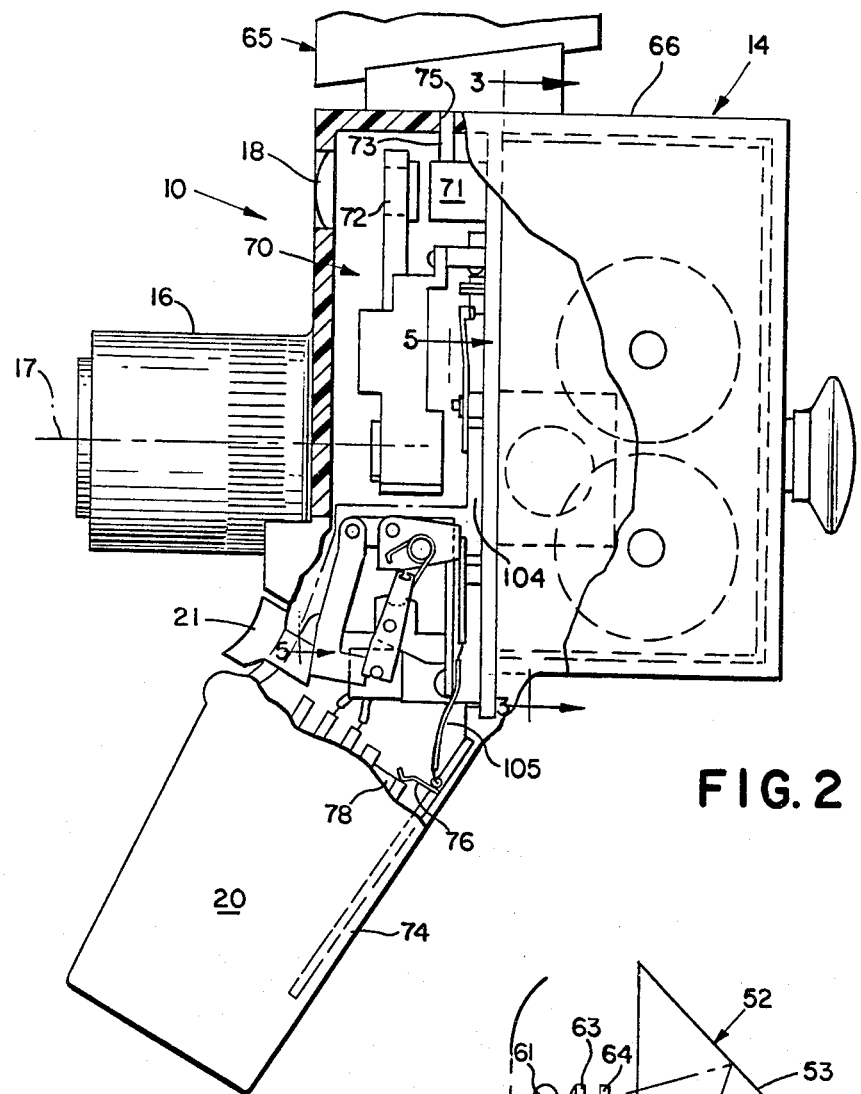
FIG. 2 is a side elevational view, partially in section, of the motion picture camera in FIG. 1.

Referring specifically to FIGS. 1 and 2 of the drawings, a motion picture camera generally designated by reference numeral 10 is shown in condition to receive a multipurpose film cassette 12. The camera 10 is of the conventional design, and includes a body 14 mounting an objective lens system 16 which defines an optical axis 17 for the camera, and auxiliary lens 18 which transmits light to an exposure control system 70, a handle grip 20 with a shutter control trigger switch 21, a shutter control mechanism which is described more fully hereinbelow, and an internal drive mechanism (not shown) by which the film strip in the cassette 12 may be advanced incrementally to expose successive frames to light images of objects or scenes formed by the lens systems in accordance with well-known motion picture photography principles.

The camera body 14 has a chamber 22 for receiving the cassette 12 in such a manner that the film strip therein will be engaged through an opening 50 in the cassette by the camera drive mechanism, and also so that drive shafts 24 and snubber roller stop 26 will engage the film spool sockets 49 and the snubber roller 54, respectively, at the cassette (FIG. 4). A closure door 28, pivoted on a hinge 30 is secured at the rear of the camera body 14 and is adapted to swing between an open position (FIG. 1) and a closed position over the chamber 22. Mounted on the closure door 28 and adjacent to the hinge 30 is a spring 32 which urges the cassette 12 to an operative position when the door is in its closed position. A latch housing 34 is adjacent to the forward edge of the chamber 22, receives a latch pawl 36 provided adjacent to the forward edge of the closure door.

As shown in FIGS. 1, 2 and 4, the film cassette 12, which is described more fully in U.S. Pat. No. 3,895,862, issued to Joseph A. Stella on July 22, 1975, is essentially a rectangular parallelepiped having a pair of opposed parallel side walls 38 and 39, edge walls 40 and 41 and end walls 42 and 43. A film strip 44 is contained within the cassette 12 and is connected at its ends to rotatably supported supply and takeup spools 46 and 48, respectively, with each spool having a drive socket 49. In its passage from the supply spool 46 to the takeup spool 48, the film strip 44 is trained along a path past the opening 50 in the leading edge wall 40 which, in the operative condition of the camera 10, is positioned in alignment with the optical axis 17 formed by the objective lens system 16. The opening 50 permits exposure of a portion of the film strip 44 when the cassette 12 is operably received within the chamber 22 and facilitates, in the viewer apparatus (not shown), the passage of light through the film for viewing the film strip after processing of an exposed film strip.

To enable image projection in the viewer (not shown) an aperture 51 (shown in FIG. 4) is provided in the side wall 39 of the film cassette 12 adjacent to the leading edge wall 40. A reflecting prism 52 is located adjacent the aperture 51 and in the side wall 39 of the cassette 12 such that during projection operations, light from a projection lamp (not shown) is admitted into the cassette 12 through the aperture 51, impinges upon an inclined surface 53 of the prism 52 and is directed through the portion of the film strip 44 positioned in front of the opening 50.

Another opening 47 provided in the side wall 39, below the aperture 51, provides access for the camera snubber roller stop 26 to engage a snubber roller 54 within the cassette 12. Directly opposite the prism 52 and in the side wall 38 are a plurality of vent openings 55 (FIG. 1) which enable the circulation of air through the cassette 12 for cooling the prism and for drying the film strip 44 after the film has been processed by a cassette-contained processor 56, as discussed more fully in the aforementioned U.S. Pat. No. 3,895,862.

Additionally, the cassette 12 is provided with a pair of electrical contacts 57 whose electrical continuity indicates an unprocessed film while the absence of such an electrical continuity indicates a processed film.

An automatic exposure control system is provided in the movie camera 10, and an exemplary system, described in U.S. Pat. No. 3,848,985, is adjusted automatically upon cassette insertion to accommodate any of several diverse film sensitivities, or ASA speeds. The speed of the film contained within a particular cassette with such a system being correlated to cassette discontinuities such as a lug 58 and a notch 59, as shown in FIG. 4.

One embodiment of the supplemental exposure correction system of the present invention may be seen in FIGS. 1, 2 and 3. As shown in FIG. 3, the side of the camera body 14 opposite the closure door 28 is provided with a protuberance 60 containing a low power light source 61, such as a light-emitting diode (LED).

The source 61 is covered by, and separated from the cassette receiving chamber 22 by a panel 62 in which is mounted a low power lens 63 and a non-uniform, neutral density filter element 64 which will be described in detail hereinbelow. The low power lens 63 and the non-uniform filter 64 are aligned with the light source 61 and the prism 52 to permit passage of light through the cassette aperture 51 to the prism 52 disposed within the cassette. To this end, the light source 61, the center line of the lens 63 and filter element 64 in the panel 62 and the center line of the aperture 51 in the cassette are substantially coaxial when the cassette 12 is in the operative position within the chamber 22 of the camera body 14. The lens 63, the filter 64, the spacing between the light source 61 and the prism 52 are such as to achieve the proper distribution of the transmitted light and coverage of the frame size of the conventional 8 mm movie film frame. The energization of the LED 61 is regulated by and substantially synchronously triggered with the operation of the camera shutter, as described more fully with respect to FIG. 5. Further, as will also be more fully described, energization of the LED 61 and accordingly, operation of the exposure correction system, is actuated by the insertion and operation of a movie light in conjunction with the camera so that the supplemental exposure light will only be provided when artificial illumination of the photographic scene is being relied upon.

Since the reflecting prism 52 contained within the cassette may be fabricated of any suitable material, such as plastic, it may contain imperfections which adversely affect the uniform distribution of the light being emanated from the low power light source 61. In order to assure that the light passing to the non-uniform filter element 64 has a substantially even distribution, the lens element 63 described hereinabove is employed in the panel 62 to optically correct for any unevenness in light coming from the light source.

Figure 5:
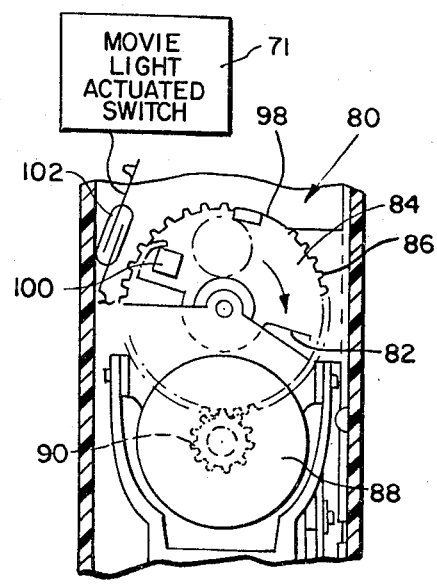
FIG. 5 is a front elevational view, partially in section, of a camera shutter control system as seen along line 5—5 in FIG. 2.

Looking now to the shutter control system, an example of a suitable system which may be incorporated into the camera 10 is described more fully in U.S. Pat. No. 3,751,149. Components of this system are shown in FIGS. 2 and 5. The exposure control system 70 includes a light responsive cell 72 which receives light from the scene through the auxilliary lens 18 to automatically control a lens aperture (not shown) located on the lens axis 17. The handle grip 20 of the camera 10 houses a plurality of batteries (not shown), which provide the power source for energizing the exposure control system 70 and the shutter drive system incorporated within the camera. The handle grip 20 includes a master switch 74 provided along the back portion of the grip. The switch 74 is positioned so that it is closed by the normal grasping of the grip 20 to close the camera control circuit by sliding a switch contact 76 into engagement with a battery contact 78. The grip 20 is preferably arranged so that the closing of the master switch 74 will instantaneously activate the exposure control system 70 to set the proper exposure for the lens system 16 before the camera is activated by depression of the shutter trigger switch 21 to start and stop the motion picture taking process.

As seen in FIG. 5, the shutter system includes a rotatable shutter disc 80 provided with an open aperture portion 82 and an opaque blocking portion 84. The shutter disc 80 is arranged within the camera body 14 so that the open aperture portion 82 and the opaque portion 84 will sequentially rotate into alignment with the optical axis 17 of the lens system 16. In this regard, the camera taking aperture 98 is shown in dotted outline behind the opaque shutter portion 84. The periphery of the rotatable shutter disc 80 is provided with a ring gear 86. Rotation of the shutter disc 80 is effected by an electric drive motor 88 which is positioned adjacent to the shutter disc and which meshes with the ring gear 86 through a drive pinion 90. The motor 88 will rotate the shutter disc 80 at a selected speed during the operation of the camera 10.

A magnet 100 is positioned adjacent to the trailing edge of the opaque blocking portion 84 of the shutter disc 80 and is rotatable therewith. Cooperatively positioned with respect to the magnet 100 is a magnetic read switch 102 which is periodically triggered by the rotating magnet to energize the light source 61 to provide supplemental illumination to the sequential frames of the film in synchronization with the operation of the shutter disc 80.

Turning again to FIG. 2, the energization of the motor 88 is accomplished by the operation of the shutter trigger switch 21, which drives a sliding switch plate 104 upwardly within the camera 10 when the trigger switch is depressed into the "run" condition. The switch plate 104 is a current-carrying member, and is connected to the power source contained in the handle grip 20 of the camera 10 by means of an electric lead 105. In the raised or "run" position, the switch plate 104 completes the circuit for the drive motor 88, and the motor operates to rotate the shutter disc 80 at a constant, selected speed in the direction shown by the arrow in FIG. 5.

As shown in FIGS. 1 and 2, the upper surface 66 of the camera body 14 is adapted to removably receive a movie light assembly 65 to provide artificial illumination of a photographic scene. As best seen in FIG. 1, the movie light assembly 65 includes a main body 67 which houses a combination lamp/reflector assembly 68 adapted to direct a beam of artificial light over the desired photographic field. A suitable source of electrical power is also provided for the movie lamp and is represented in the drawing figures by an electrical cord 69 which may be operably attached to a suitable source of power to provide electrical power directly to the movie lamp assembly 65. An alternative arrangement would be to provide a supply of external electrical power to the camera itself and, through a known switching arrangement provided in the camera, control electrical power to the movie lamp by way of the camera-contained handle grip switch 74. Such an arrangement would actuate the movie lamp 65 and the exposure control system 70 prior to actuation of the trigger switch 21 and initiation of the actual picture taking process. With such an arrangement, the photographer, upon picking up the camera 10 would activate the movie lamp 65 to illuminate the photographic scene, which would otherwise be dark. In addition, illuminating the photographic scene at this time would allow the exposure control circuit to adjust the camera aperture setting to the quantity of light in the field of view of the camera prior to initiation of actual exposure.

In order to ensure that the supplemental exposure correction system does not operate when taking movies without the movie light, a movie light actuated switch 71 is provided within the camera body. The switch 71 is engaged and actuated by means carried by the movie lamp from a first position wherein the exposure correction system is inoperable to a second position which serves to actuate or enable the exposure correction system. Such switch 71 is shown diagrammatically in both FIGS. 2 and 5. The means carried by the camera for engaging the switch 71 is shown as a prong or extension 73 of the movie light body 67 which is adapted to be received in a mating opening 75 in the top wall 66 of the camera body 14. The extension engages and actuates the switch 71 to enable the supplemental exposure control system and may serve as well to assist in mounting the movie light assembly onto the camera.

Prior to generally describing the supplemental exposure correction system operation, the film strip will be described with regard to FIG. 6. The film strip 44 may be of the diffusion transfer additive color type such as that exemplified by the disclosure of U.S. Pat. No. 3,894,871 issued July 15, 1975, to Edwin H. Land. As disclosed in this patent, the film strip 44 comprises a transparent support 109, forming a frontal layer as viewed in the camera 10, and carrying an additive color screen, or raster layer 110, composed of alternating red, green and blue filter segments or elements. An image-receiving layer 111 and a silver halide emulsion layer 112 are successively mounted behind the raster layer 110. Finally, an innermost layer 114, sometimes referred to as an "overcoat" or "topcoat," forms the back surface as viewed in the camera 10. This innermost layer 114 is free of silver halide or silver precipitating agents, is permeable to the processing composition and has been found to provide a number of useful benefits. Such a layer may be used to carry one or more agents, such as antihalation dyes and/or image stabilizing agents, useful in the film developing process. Additional information regarding the structure, chemical composition, fabrication, processing, etc. of the film 44 may be had by reference to the aforesaid U.S. Pat. No. 3,894,871.

Figure 7:
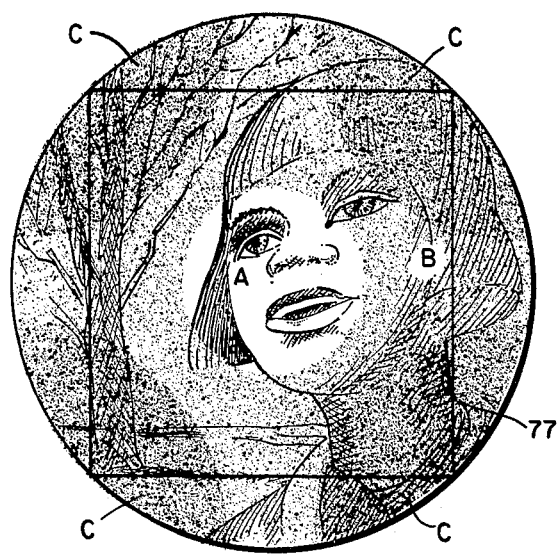
FIG. 7 illustrates a representative non-uniform artificial illumination pattern such as might be obtained with a commercially available movie light.

To facilitate understanding of the operative principle of the in-camera supplemental exposure correction system of the present invention, a representative artificial illumination pattern and a filter suitable for correct exposure of a photograph taken with such a source of illumination will be discussed. FIG. 7 illustrates a representative non-uniform illumination pattern which would be provided over the scene area defined by a typical camera having a given acceptance angle such that there is a difference in illumination between at least a first and a second portion of the scene area. More specifically, in the illustrated representative pattern, the illumination is non-uniform yet symmetrical about the center of the scene area, there being three distinct zones shown, the first being a circular area "A" lying in the center of the scene area, which receives the greatest amount of artificial illumination. A second intermediate illumination area "B" is symmetrically provided in outlying relationship to the central circular area "A", and a third least illuminated area comprising four separate regions "C" is positioned at the outlying edges of the illuminated scene area at substantially 90° with respect to one another. While the illuminated scene area is shown as circular because of the circular characteristics of the artificial illumination system optics as well as the optics of the camera, a rectangular outline 77 of the final photographic exposure format is provided on the non-uniform illumination pattern of FIG. 7 and a representative illuminated scene is shown in simplified outline form whereby it is seen that different portions of the scene lie in the different zones or sections of illumination. It should be appreciated that without the supplemental exposure correction system of the present invention, the photograph taken with such artificial illumination system would be exposed substantially in the manner illustrated in FIG. 7.

Figure 8:
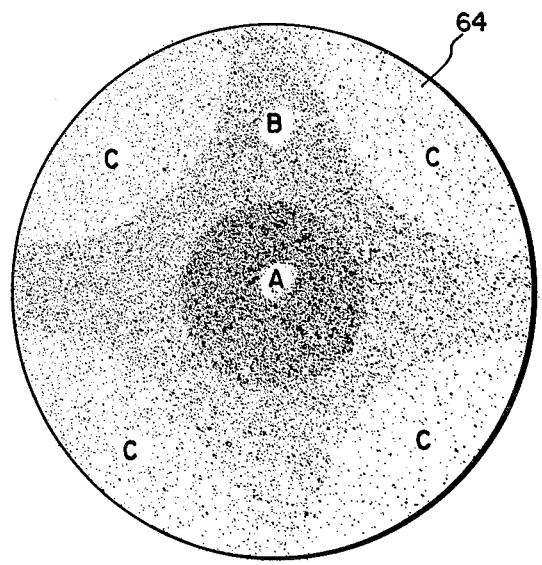
FIG. 8 represents a patterned filter to be used with the supplementary exposure correction system to compensate for a non-uniform illumination pattern such as that shown in FIG. 7.
Figure 9:
FIG. 9 is representative of an evenly exposed final picture having equal exposure as a result of the use of the system of the present invention.

FIG. 8 represents a greatly enlarged showing of a non-uniform patterned filter element 64 to be used in the supplemental exposure correction system of the present invention to correct the non-uniform exposure which would be obtained in using the artificial illumination assembly resulting in the pattern shown in FIG. 7. It will be appreciated in comparing FIG. 8 with FIG. 7, that FIG. 8 is also provided with three distinct zones "A", "B" and "C" complementary to those of FIG. 7, but having a density inversely proportional to the degree of illumination shown in FIG. 7. As a result, and as will be described hereinbelow, use of such a filter element in conjunction with the low power light source 61 will result in supplemental exposure illumination to the film with greater illumination going to the least exposed portion "C" of the pattern of FIG. 7, a lesser amount to the intermediate region "B" of FIG. 7, and the least amount of supplemental exposure light to the central circular region "A" of FIG. 7, the result of such supplemental illumination to the film being an equally exposed photograph as shown in FIG. 9.

Figure 6:
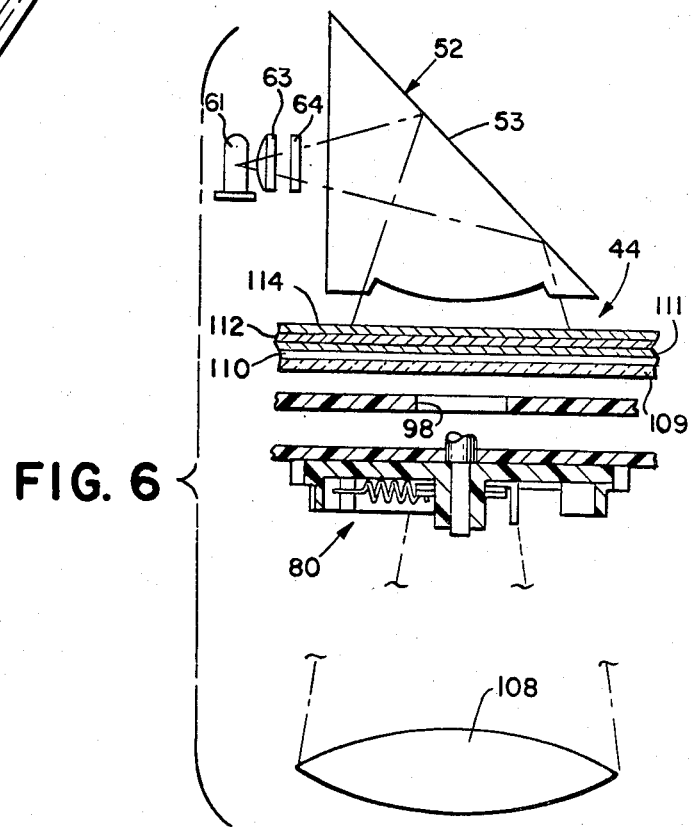
FIG. 6 is a diagrammatic view, in an enlarged scale, illustrating the supplemental exposure system of the present invention.

The operative principle of the in-camera supplemental exposure correction system of the present invention may be more clearly seen by reference to the schematic illustration of FIG. 6. When the light source 61 is energized, a short burst of emitted light passes through the lens insert 63 where an even distribution of light is achieved; from here the light passes through the non-uniform patterned filter element 64; and, from there enters the prism 52 and impinges upon the inclined reflective surface 53. The non-uniform supplemental light is then directed by the prism 52 onto the back surface 114 of the film strip 44. Substantially simultaneously therewith, scene exposure begins with light reflected from the object or scene to be photographed, passing through the objective lens system 16 of the camera 10, of which one lens elemet 108 is shown in the figure. Light passing through the lens element 108 is passed by the open shutter portion 82, operating in the fashion described above, and through the camera image aperture 98 to impinge upon the front surface of the transparent support 109 of the film strip 44.

An example of a suitable control circuit, which may be operatively coupled to the shutter control system described above, for controlling the energization of the light source 61 with the operation of the rotatable shutter disc 80 is shown and described in detail in U.S. Pat. No. 4,172,640 entitled "Movie Camera Having Supplemental Exposure" to Edwin H. Land, assigned to the assignee of the present application. Such control circuit may be designed to give an added degree of control to the system, it may include a time delay circuit for controlling the duration of the energization of the light source 61 of the exposure correction system.

In the foregoing discussion, one embodiment of the supplemental exposure correction system was described with reference to a non-uniform artificial illumination distribution such as that shown in FIG. 7, using a supplemental illumination filter (shown in FIG. 8) complementary to that illumination pattern to obtain the desired substantially equal exposure. It should be appreciated that the non-uniformity of the illumination pattern of sources of artificial lighting may vary substantially from one light source to another and, accordingly, the filter element 64 used with any given light source should be selected or fabricated to complement the non-uniform illumination pattern of that given source in the inverse manner according to the principle of the invention. One manner in which the non-uniformity of an illumination pattern of a particular artificial light source may be determined would be to take a photograph of a substantially uniform color background illuminated with the artificial light source at a predetermined distance of, for example, 10 to 12 feet. Upon development of such exposure, an illumination distribution pattern of the type illustrated in FIG. 7 may be derived for that light source. With this information available, a filter element complementary to such illumination distribution may be fabricated by any of several techniques. For example, a number of layers of a neutral density filter material may be laminated one upon the other with a greater number of layers in the region in which less supplimentary illumination is desired. Another technique would be to use a commercially available shading material used by artists, one type of which is known as a Benday screen, to provide a selectively greater degree of shading and hence less supplementary illumination passing through those areas in which the artificial illumination pattern of the given light source is the brightest.

Thus, it will be seen that as a result of the present invention, the unique, effective in-camera supplemental exposure correction system is provided for photographic cameras in general and, more specifically, for a motion picture cassette system of the type described above. Also, it will be appreciated by those skilled in the art that various modifications in the embodiments of the invention disclosed and illustrated herein may be made without departing from the invention. For example, while the foregoing description has related the supplemental exposure correction system of the present invention to the operative environment of a movie camera, it will be seen that the system may be readily adapted to a still photography camera. It is expressly intended, therefore, that the foregoing description is illustrative only, not limiting, of preferred embodiments, and that the true spirit and socpe of the present invention be determined by reference to the appended claims.

What is claimed is:

1. Camera apparatus comprising:
   means for locating photographic film at a given focal plane;
   means for transmitting image-forming light rays along an exposure path from a photographic scene to said focal plane for exposing film thereat, said transmitting means defining a given camera acceptance angle and having an optical axis;
   means for providing artificial illumination of the photographic scene, said illumination providing means producing a predetermined non-uniform illumination pattern over the scene area defined by said acceptance angle such that there is a difference in illumination between at least a first and a second portion of said scene area; and
   supplemental illumination means for directing filtered non-uniform supplemental illumination along a path other than the exposure path to only one section of said focal plane corresponding to the one of said scene portions having the lower predetermined illumination to reduce the difference in level of exposure of said first and second portions anticipated as a result of said non-uniform illumination.

2. The apparatus of claim 1 wherin the amount of said supplemental illumination directed to said one section is approximately inversely proportional to the illumination distribution across said one scene portion.

3. The apparatus of claim 1 wherein said supplemental illumination is directed to additional sections of said focal plane in approximate inverse relation to said predetermined illumination pattern.

4. The apparatus of claim 3 wherein said supplemental illumination is substantially the inverse of said predetermined illumination pattern.

5. The apparatus of claim 4 wherein said predetermined illumination pattern is substantially symmetrical about said optical axis with the intensity of illumination at any given point on a plane normal to said optical axis generally decreasing as said point's distance from said optical axis increases.

6. The apparatus of claim 1 wherein said non-uniform supplemental illumination means is located interiorly of said camera apparatus.

7. Camera apparatus for use with a source of illumination which provides a non-uniform illumination pattern over the scene area defined by the acceptance angle of the apparatus such that a first portion of the scene has lower artificial illumination from said source as compared to a second portion of the scene, said apparatus including means for transmitting light rays from the scene along a given exposure path to the camera focal plane, the improvement comprising supplemental illumination means for directing filtered supplemental illumination to said focal plane along a path other than the exposure path in a non-uniform manner with said supplemental illumination being directed to at least a first selection of said focal plane which corresponds to said first scene portion so as to direct a greater amount of said supplemental illumination to said first section of said focal plane as compared to a second section thereof which corresponds to the second of said scene portions thereby reducing the difference in exposure level of said focal plane sections.

8. The improvement of claim 7 wherein said supplemental illumination is directed only to said first section.

9. The improvement of claim 7 wherein the amount of supplemental illumination directed to said first and second sections is approximately inversely proportional to the level of artificial illumination of said first and second scene portions.

10. The improvement of claim 7 wherein the distribution of artificial illumination from said source varies gradually across one portion of the scene, and said supplemental illumination is made to vary gradually in inverse relation across the focal plane section corresponding to said one portion of the scene.

11. The apparatus of claim 7 wherein said non-uniform supplemental illumination means is located interiorly of said camera apparatus.

* * * * *